(12) United States Patent
Zabdyr

(10) Patent No.: US 10,112,462 B1
(45) Date of Patent: Oct. 30, 2018

(54) VEHICLE VISOR EXTENSION SYSTEM

(71) Applicant: Judith J. Zabdyr, Sioux Falls, SD (US)

(72) Inventor: Judith J. Zabdyr, Sioux Falls, SD (US)

( * ) Notice: Subject to any disclaimer, the term of this patent is extended or adjusted under 35 U.S.C. 154(b) by 0 days.

(21) Appl. No.: 15/357,076

(22) Filed: Nov. 21, 2016

(51) Int. Cl.
B60J 3/02 (2006.01)

(52) U.S. Cl.
CPC .......... B60J 3/0208 (2013.01); B60J 3/0239 (2013.01)

(58) Field of Classification Search
CPC .............................. B60J 3/0208; B60J 3/0239
See application file for complete search history.

(56) References Cited

U.S. PATENT DOCUMENTS

| | | | |
|---|---|---|---|
| 1,941,032 A | 12/1933 | Knowles | |
| 2,842,395 A | 7/1958 | Davis | |
| 3,480,322 A * | 11/1969 | Pollak | B60J 3/0208 296/97.8 |
| 3,865,428 A | 2/1975 | Chester | |
| 4,090,733 A | 5/1978 | Altschul | |
| 4,844,530 A | 7/1989 | Mahler | |
| 5,261,717 A | 11/1993 | Tsumura | |
| 5,356,192 A | 10/1994 | Schierau | |
| 6,176,539 B1 | 1/2001 | Westerman | |
| 6,220,644 B1 | 4/2001 | Tiesler | |
| 6,231,108 B1 * | 5/2001 | Nicol | B60J 3/0208 296/97.5 |
| 6,318,787 B1 | 11/2001 | Fahy | |
| 6,325,443 B1 | 12/2001 | Sanchez | |
| 6,328,370 B1 | 12/2001 | Kim | |
| 6,616,209 B1 | 9/2003 | Muyo | |
| 6,705,661 B2 | 3/2004 | Amirmoini | |
| 7,537,263 B2 | 5/2009 | Delphia | |

FOREIGN PATENT DOCUMENTS

WO 2014061009 4/2014

* cited by examiner

*Primary Examiner* — D Glenn Dayoan
*Assistant Examiner* — Melissa A Black
(74) *Attorney, Agent, or Firm* — Jeffrey A. Proehl; Woods, Fuller, Shultz & Smith, PC

(57) ABSTRACT

A vehicle visor accessory device for selectively extending shading capabilities of a visor may comprise a sleeve structure configured to removably mount on the visor. The sleeve structure may be elongated with an upper end for positioning toward the upper edge section of the visor and a lower end for positioning toward the lower edge section of the visor, and have a first opening located at a first side edge of the sleeve structure through which a portion of the visor is slidable. A notch may be formed in the sleeve structure. An extension structure may be integrated with the sleeve structure. The sleeve structure may have a substantially hollow interior between first and second faces to slidably receive at least a portion of the visor and the extension structure may have a solid interior between the faces to extend light blocking coverage of the visor.

6 Claims, 2 Drawing Sheets

VEHICLE VISOR EXTENSION SYSTEM

BACKGROUND

Field

The present disclosure relates to vehicle visors and more particularly pertains to a new vehicle visor extension system for selectively increasing the light-blocking ability of a vehicle's visor when needed.

SUMMARY

In one aspect, the disclosure relates to a vehicle visor accessory device for selectively extending shading capabilities of a visor having an inboard end and an outboard end. The visor has a perimeter with an upper edge section and a lower edge section. The accessory device may comprise a sleeve structure configured to removably mount on at least a portion of the visor, and the sleeve structure may be elongated with an upper end for positioning toward the upper edge section of the visor and a lower end for positioning toward the lower edge section of the visor. The sleeve structure may have a first opening located at a first side edge of the sleeve structure through which a portion of the visor is slidable. The sleeve structure may have an upper end edge and a lower end boundary, and a notch may be formed in the sleeve structure which may be located at the upper end and extending into the upper end edge and the first side edge. A portion of the sleeve structure adjacent to the notch may form an outer tab. The device may also have an extension structure integrated with and extending from the lower end boundary of the sleeve structure to a lower edge of the extension structure. The sleeve structure may have a substantially hollow interior between the first and second faces of the device to slidably receive at least a portion of the visor and the extension structure may have a solid interior between the first and second faces of the device to extend light blocking coverage of the visor.

In another aspect, the disclosure relates to a system that may comprise a vehicle visor having an inboard end and an outboard end with the inboard end being mounted on the vehicle and the outboard end being a free end. The visor may have a perimeter with an upper edge section and a lower edge section. The system may also comprise a vehicle visor accessory device for selectively extending shading capabilities of the visor. The device has opposite first and second faces and may comprise a sleeve structure removably mounted on at least a portion of the visor, with the sleeve structure being elongated with an upper end positioned toward the upper edge section of the visor and a lower end positioned toward the lower edge section of the visor. The sleeve structure may have a first opening located at a first side edge of the sleeve structure through which a portion of the visor is inserted, and may have an upper end edge and a lower end boundary. A notch may be formed in the sleeve structure and may be located at the upper end and extend into the upper end edge and the first side edge, with a portion of the sleeve structure adjacent to the notch forming an outer tab. The device may have an extension structure integrated with and extending from the lower end boundary of the sleeve structure to a lower edge of the extension structure. The sleeve structure may have a substantially hollow interior between the first and second faces of the device which receives at least a portion of the visor and the extension structure may have a solid interior between the first and second faces of the device to extend light blocking coverage of the visor.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components, or the particulars of the steps, set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein:

FIG. 3 is a schematic side sectional view of the accessory device and visor of the system taken along line 3-3 of FIG. 2, according to an illustrative embodiment.

DETAILED DESCRIPTION

Figure 1:
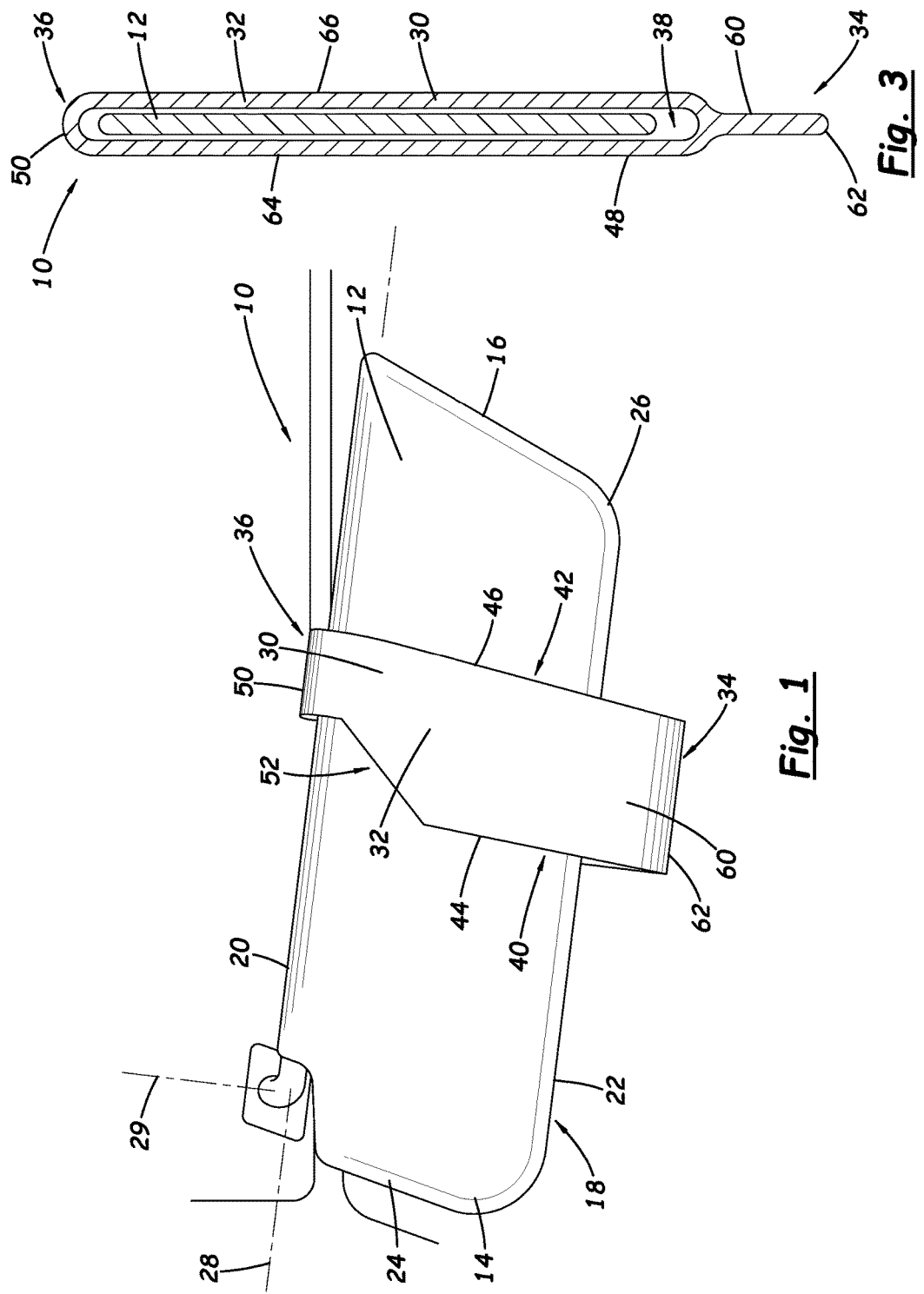
FIG. 1 is a schematic front view of a new system of a vehicle visor accessory device mounted on a visor according to the present disclosure.
Figure 2:
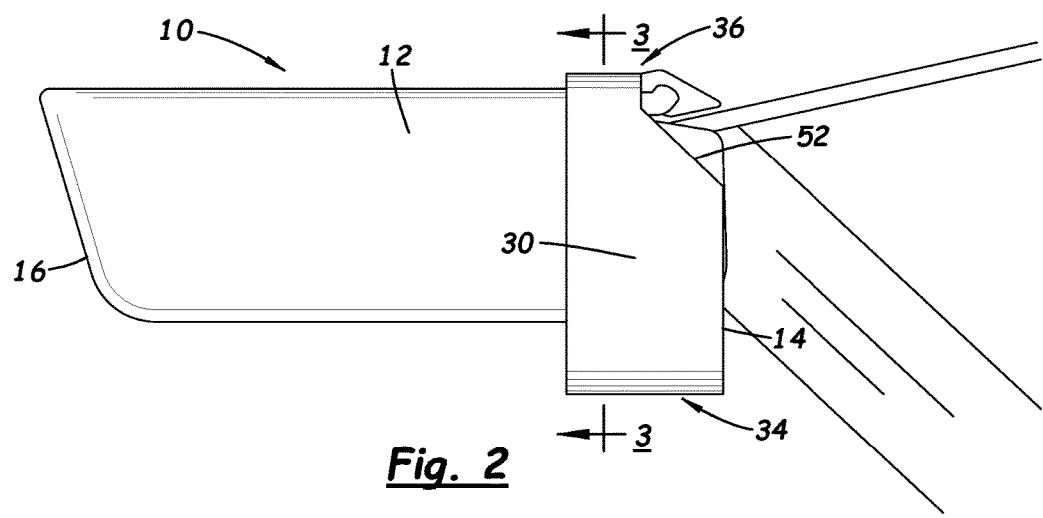
FIG. 2 is a schematic front view of the accessory device mounted on the visor with the device shown adjacent the inboard end of the visor, according to an illustrative embodiment.
Figure 4:
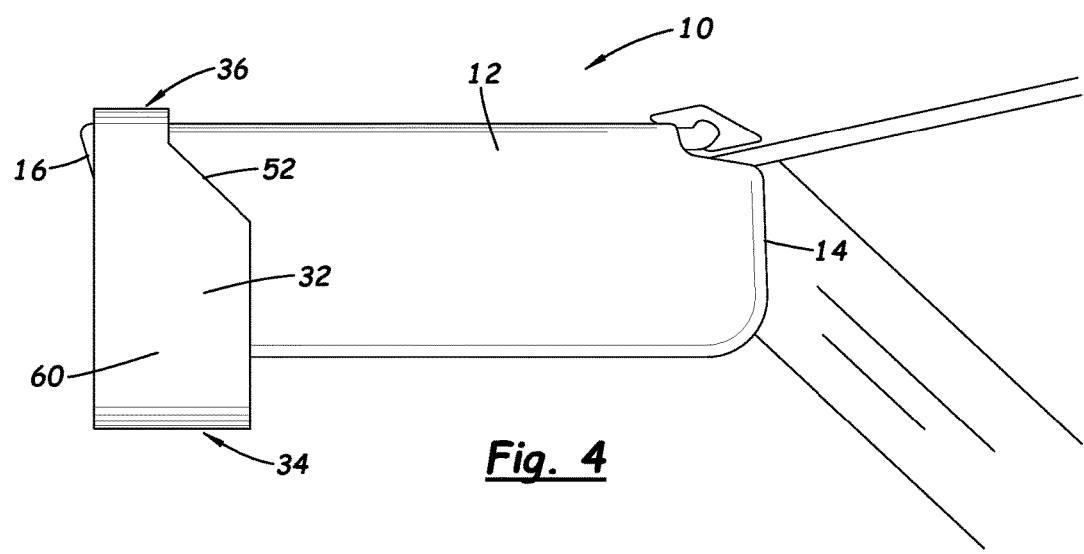
FIG. 4 is a schematic front view of the accessory device mounted on the visor with the device shown adjacent the outboard end of the visor, according to an illustrative embodiment.

With reference now to the drawings, and in particular to FIGS. 1 through 4 thereof, a new vehicle visor extension system embodying the principles and concepts of the disclosed subject matter will be described.

The applicant has recognized that the visors provided in vehicles are often inadequate for blocking the sun from the eyes of the operator of the vehicle due to the size limitations placed on the visor so that the visor is not overly bulky and does not fold away adequately, or has an unattractive appearance. The applicant has also recognized that many of the attempts to extend or enlarge the coverage of a visor have utilized extension devices that require making changes to the visor that may damage the visor or make the visor unattractive when the device is removed from the visor, which may decrease the resale value of the vehicle or incur damage charges when a vehicle is surrendered at the end of a lease. Further, extension devices with complicated mounting means make it difficult to quickly and easily install the device or remove it to transfer it to a different vehicle. Those devices requiring a portion to be unfolded to achieve maximum extension also present difficulties, particularly when the material forming the device has "memory" that tends to resist the folded portion remaining in an unfolded condition to provide the extension. The unfolded portion may also be free to swing or sway on its hinge and thus provide varying effectiveness at blocking light. Further, elements such as snaps must be utilized to hold the folding portions in the folded position and requires a one- or two-handed operation in order to release the snaps, which may be particularly difficult when operating the vehicle. Wearing of the snaps over time may also reduce their effectiveness for holding the portion in a folded position.

The applicant has devised an accessory device for using with a vehicle visor that is capable of extending the width of the visor to thereby extend the coverage of the visor in a vertical direction. The disclosed device is able to provide the extended coverage without requiring the use of any special mounting structures that might damage the visor or the interior of the vehicle, or requires modification of the visor, and is easily mountable as well dismountable from the visor for storage or use on other vehicles. Further, unfolding of the device is not required to achieve any of the coverage extension. Additionally, the accessory device may be easily used on the visor located on the passenger side of the vehicle simply by reversing the orientation of the device and the direction of insertion of the visor into the device.

In one aspect, the disclosure relates to a system 10 which may comprise a vehicle visor 12 in combination with a vehicle visor accessory device 30 which is configured to removably mount on the visor 12 to selectively extend the shading capabilities of the visor. The disclosure also relates to the vehicle visor accessory device 30 apart from visor 12. The visor 12 may have an inboard end 14 and outboard end 16, with the inboard and being located relatively closer to the point of mounting of the visor on the vehicle and the outboard end being located relatively further from the point of mounting. The visor 12 may have a perimeter 18 with an upper edge section 20, a lower edge section 22, and inboard edge section 24, and an outboard edge section 26. The inboard end 14 may be mounted on the vehicle and the outboard end may be an end free of direct connection to the vehicle. The visor 12 may be pivotable about a substantially horizontal axis 28, and may be swivelable about a substantially vertical axis 29. The visor 12 may pivot about the horizontal axis 28 that extends along the upper edge section 20, and may swivel about the vertical axis 29 along the inboard edge section 24. The length of the visor 12 may thus be defined or measured between the inboard 14 and outboard 16 ends. The width of the visor may be defined between the upper edge section 20 and the lower edge section 22 of the perimeter 18, and may be generally uniform between the inboard 14 and outboard 16 ends.

The vehicle visor accessory device 30 of the system 10 may be configured to slidably receive at least a portion of the visor 12 to effectively mount the device 30 on the visor as well as the vehicle on which the visor is mounted. The accessory device 30 be elongated with an upper end 36 for positioning toward the upper edge section 20 of the visor and an lower end 34 for positioning toward the lower edge section 22 of the visor. The distance between the lower 34 and upper 36 ends may define a length of the device 30, and the length of the device may be similar to the length of the visor, although embodiments of the device 30 may have a length that is less than the length of the visor or is greater than the length of the visor. The device 30 is generally flat and thin with a thickness that is sufficient to form a hollow interior space that is able to receive a portion of the visor.

The accessory device 30 may comprise a sleeve structure 32 which is configured to mount on at least a portion of the visor and an extension structure 60 which extends from the sleeve structure beyond the visor. The sleeve structure 32 of the device 30 may have a substantially hollow interior 38 or cavity for receiving a portion of the visor, and may snugly receive the visor to provide a degree of resistance to sliding or slippage of the device on the visor. The length of the hollow interior in the direction between the upper 36 and lower 34 ends may be selected to fit a range of different visor widths. The sleeve structure may have a first side edge 44, a second side edge 46, a lower end boundary 48, and an upper end edge 50. A first opening 40 into the interior 38 may be being located at the first side edge 44 through which a portion of the visor may pass, and a second opening 42 into the interior may be located at the second side edge 46 also for passing a portion of the visor. The width of the device 30 may be defined between the first 44 and second 46 side edges, and the device's width may be substantially narrower than the length of the visor. For example, the width of the device 30 may be approximately 20 percent to approximately 80 percent of the length of the visor, and in some embodiments the width of the device may be approximately 20 percent to 50 percent of the length of the visor.

A notch 52 may be formed in the sleeve structure for accommodating an element of the mounting structure of the visor, such as the swivel mount of the visor or the clip on the vehicle releasably gripping a shaft on the visor located toward the outboard end 16. The notch may be located at the upper end 36, and may extend into the first side edge 44 and the upper end edge 50. A portion of the sleeve structure 32 located adjacent to the notch 52 may form an upper tab 54.

The accessory device 30 may also include an extension structure 60 which extends from the sleeve structure 32 to a lower edge 62 of the extension structure to effectively extend or increase the shading capabilities of the device 30 and the visor 12. The extension structure 60 may extend along the lower boundary 48 of the sleeve structure, and may extend from the first side edge 44 to the second side edge 46. The extension structure 60 may have a solid interior which is not hollow and not designed to receive a portion of the visor such that the width of the device 30 is greater than the width of the visor while still maintaining a relatively snug fit on the sleeve structure on the visor. The device 30 may have opposite first 64 and second 66 faces, and the space between the faces may be hollow at the sleeve structure of the device, and may be solid and continuous material between the faces 64, 66 at the extension structure 60 such that the device may accept and snugly fit a visor with a width that is smaller than the width of the accessory device. The extension structure may be rigidly integrated with the sleeve structure such that the extension structure remains in the same plane as the sleeve structure and resists bending of the extension structure with respect to the sleeve structure.

The width of the device 30 may be defined between the upper edge 44 of the sleeve structure and the lower boundary

46 of the extension structure. The width of the device is greater than the width of the visor, and may exceed the width of the visor by at least approximately 10 percent, and may exceed by approximately 20 percent to approximately 40 percent, and may extend to even as much as approximately 50 percent.

In use, the outboard end 16 of the visor may be inserted into the interior 38 of the sleeve structure through the first opening 40. The sleeve structure may be advanced along the visor for a distance sufficient to allow outboard end 16 of the visor to protrude from the notch 52, which may permit a mounting clip of the interior of the vehicle to engage a shaft on the visor to permit normal horizontal pivot movement of the visor about the substantially horizontal axis 28 of the visor. Optionally, the device may be slid further along the visor to take a position one the visor that is suitable to block the sunlight coming through the windshield from striking the user's eyes. Pivoting the visor downwardly about the axis 28 permits the extension structure 60 to provide increased light blockage in the vertical direction than is otherwise capable by the visor alone. Removal of the device 30 for storage or transfer to another vehicle simply requires that the sleeve structure be slid off of the visor.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

I claim:

1. A vehicle visor accessory device for selectively extending shading capabilities of a visor having an inboard end and an outboard end, the visor having a perimeter with an upper edge section and a lower edge section, the accessory device comprising:
    a sleeve structure configured to removably mount on at least a portion of the visor, the sleeve structure being elongated with an upper end for positioning toward the upper edge section of the visor and a lower end for positioning toward the lower edge section of the visor, the sleeve structure having a first opening located at a first side edge of the sleeve structure through which a portion of the visor is slidable, the sleeve structure having an upper end edge and a lower end boundary, a notch being formed in the sleeve structure, the notch being located at the upper end and extending into the upper end edge and the first side edge, a portion of the sleeve structure adjacent to the notch forming an outer tab; and
    an extension structure integrated with and extending from the lower end boundary of the sleeve structure to a lower edge of the extension structure;
    wherein the sleeve structure has a substantially hollow interior between the first and second faces of the device to slidably receive at least a portion of the visor and the extension structure has a solid interior between the first and second faces of the device to extend light blocking coverage of the visor;
    wherein the extension structure extends from the first side edge to the second side edge of the sleeve structure such that the accessory device has a substantially uniform width between the notch of the sleeve structure and the lower edge of the extension structure.

2. The device of claim 1 wherein a portion of the first side edge of the sleeve structure that forms the notch extends at an oblique angle with respect to a portion of the first side edge and the second side edge of the sleeve structure which define the substantially uniform width of the extension structure.

3. The device of claim 1 wherein the sleeve structure has a second opening located at the second side edge of the sleeve structure through which a portion of the visor is slidable.

4. A system comprising:
    a vehicle visor having an inboard end and an outboard end, the inboard end being mounted on the vehicle and the outboard end being a free end, the visor having a perimeter with an upper edge section and a lower edge section; and
    a vehicle visor accessory device for selectively extending shading capabilities of the visor, the device having opposite first and second faces, the accessory device comprising:
        a sleeve structure removably mounted on at least a portion of the visor, the sleeve structure being elongated with an upper end positioned toward the upper edge section of the visor and a lower end positioned toward the lower edge section of the visor, the sleeve structure having a first opening located at a first side edge of the sleeve structure through which a portion of the visor is inserted, the sleeve structure having an upper end edge and a lower end boundary, a notch being formed in the sleeve structure, the notch being located at the upper end and extending into the upper end edge and the first side edge, a portion of the sleeve structure adjacent to the notch forming an outer tab; and
        an extension structure integrated with and extending from the lower end boundary of the sleeve structure to a lower edge of the extension structure;
        wherein the sleeve structure has a substantially hollow interior between the first and second faces of the device which receives at least a portion of the visor and the extension structure has a solid interior between the first and second faces of the device to extend light blocking coverage of the visor; and
        wherein the extension structure extends from the first side edge to the second side edge of the sleeve structure such that the accessory device has a substantially uniform width between the notch of the sleeve structure and the lower edge of the extension structure.

5. The system of claim 4 wherein a portion of the first side edge of the sleeve structure that forms the notch extends at an oblique angle with respect to a portion of the first side edge and the second side edge of the sleeve structure which define the substantially uniform width of the extension structure.

6. The system of claim 4 wherein the sleeve structure of the accessory device has a second opening located at the second side edge of the sleeve structure through which a portion of the visor is inserted.

* * * * *